(12) United States Patent
Liberty et al.

(10) Patent No.: US 9,189,785 B2
(45) Date of Patent: Nov. 17, 2015

(54) DEBIT NETWORK ROUTING SELECTION USING A SCANNABLE CODE

(71) Applicants: Michael A. Liberty, Windermere, FL (US); Steve Bacastow, Cumming, GA (US)

(72) Inventors: Michael A. Liberty, Windermere, FL (US); Steve Bacastow, Cumming, GA (US)

(73) Assignee: Mozido, Inc., Austin, TX (US)

( * ) Notice: Subject to any disclaimer, the term of this patent is extended or adjusted under 35 U.S.C. 154(b) by 0 days.

(21) Appl. No.: 13/974,375

(22) Filed: Aug. 23, 2013

(65) Prior Publication Data

US 2014/0054369 A1    Feb. 27, 2014

Related U.S. Application Data (60) Provisional application No. 61/704,337, filed on Sep. 21, 2012, provisional application No. 61/693,055, filed on Aug. 24, 2012.

(51) Int. Cl.
| | |
|---|---|
| G06K 19/00 | (2006.01) |
| G06K 5/00 | (2006.01) |
| G06Q 40/00 | (2012.01) |
| G06Q 20/26 | (2012.01) |
| G06Q 20/32 | (2012.01) |

(52) U.S. Cl.
CPC ............ *G06Q 20/26* (2013.01); *G06Q 20/3274* (2013.01)

(58) Field of Classification Search
CPC ..... G06Q 40/00; G06Q 20/26; G06Q 20/227; G06Q 20/354; G06Q 30/06; G06Q 30/02; G06Q 20/12; G06Q 20/204; G06Q 20/20; G06Q 20/36; G06Q 30/0601; G06Q 20/387; G06Q 30/0641; G06Q 20/351; G06Q 20/40; G06K 19/083

See application file for complete search history.

(56) References Cited

U.S. PATENT DOCUMENTS

| | | | |
|---|---|---|---|
| 8,380,177 B2 | 2/2013 | Laracey | |
| 8,639,621 B1 * | 1/2014 | Ellis et al. ....................... | 705/41 |
| 2005/0027648 A1 | 2/2005 | Knowles et al. | |
| 2005/0125343 A1 * | 6/2005 | Mendelovich ......... | G06Q 20/04 705/39 |

(Continued)

FOREIGN PATENT DOCUMENTS

| | | |
|---|---|---|
| WO | 2012158133 | 11/2012 |
| WO | 2014093943 | 6/2014 |

OTHER PUBLICATIONS

International Search Report and Written Opinion of PCT/US13/75199 dated Apr. 29, 2014.

(Continued)

*Primary Examiner* — Thien T Mai
(74) *Attorney, Agent, or Firm* — Workman Nydegger (57) ABSTRACT

Embodiments are directed to selecting a debit network using a quick response (QR) code and to processing a payment using a debit network selected according to information embedded in a QR code. In one scenario, a mobile computer system receives input indicating that a user has initiated a payment for various items sold by a provider of goods or services. The mobile computer system determines that the user or the provider has specified a preference indicating which debit network is to be used to process the payment. The mobile computer system then generates a QR code with the debit network selection and portions of the user's debit account information embedded in the QR code, and sends the generated QR code to a payment processing system. The payment processing system may be cloud-based, or may be run locally at the provider's point of sale.

21 Claims, 5 Drawing Sheets

(56) References Cited

U.S. PATENT DOCUMENTS

| | | | |
|---|---|---|---|
| 2006/0208065 A1* | 9/2006 | Mendelovich | G06Q 20/04 235/380 |
| 2007/0058041 A1 | 3/2007 | Arseneau et al. | |
| 2007/0088624 A1 | 4/2007 | Vaughn et al. | |
| 2007/0130016 A1 | 6/2007 | Walker et al. | |
| 2008/0172317 A1 | 7/2008 | Deibert et al. | |
| 2008/0222048 A1 | 9/2008 | Higgins et al. | |
| 2009/0204530 A1 | 8/2009 | Hanson | |
| 2009/0254479 A1 | 10/2009 | Pharris | |
| 2010/0051685 A1* | 3/2010 | Royyuru et al. | 235/379 |
| 2010/0282836 A1 | 11/2010 | Kempf et al. | |
| 2012/0078673 A1 | 3/2012 | Koke et al. | |
| 2012/0085829 A1 | 4/2012 | Ziegler | |
| 2012/0209749 A1* | 8/2012 | Hammad et al. | 705/27.1 |
| 2012/0267432 A1 | 10/2012 | Kuttuva | |
| 2012/0290421 A1 | 11/2012 | Qawami et al. | |
| 2013/0228616 A1* | 9/2013 | Bhosle et al. | 235/375 |
| 2014/0058834 A1 | 2/2014 | Liberty et al. | |
| 2014/0172531 A1 | 6/2014 | Liberty et al. | |

OTHER PUBLICATIONS

International Search Report for PCT/US11/00855 dated Nov. 9, 2011.

Gao et al. "A 2-D Barcode-Based Mobile Payment System," In. MUE '09 Third International Conference on Multimedia and Ubiquitous Engineering, 2009, pp. 320-329.

* cited by examiner

DEBIT NETWORK ROUTING SELECTION USING A SCANNABLE CODE

CROSS REFERENCE TO RELATED APPLICATIONS

This application claims priority to and the benefit of U.S. Provisional Application Ser. No. 61/704,337, entitled "Debit Network Routing Selection Using a QR Code", filed on Sep. 21, 2012. This application also claims priority to and the benefit of U.S. Provisional Application Ser. No. 61/693,055, entitled "Debit Network Routing Selection Using a QR Code", filed on Aug. 24, 2012. Both of these applications are incorporated by reference herein in their entirety.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

Today's smart phones use software applications to perform a wide variety of functionality. In some cases, this functionality may include the ability to pay for items using a mobile payment system. Such a mobile payment system may allow users to pay for items at a store or over the internet using their phone.

BRIEF SUMMARY

Embodiments described herein are directed to selecting a debit network using a quick response (QR) code and to processing a payment using a debit network selected according to information embedded in a QR code. In one embodiment, a mobile computer system receives input indicating that a user has initiated a payment for various items sold by a provider of goods or services. The mobile computer system determines that the user or the provider has specified a preference indicating which debit network is to be used to process the payment. The mobile computer system then generates a QR code with the debit network selection and portions of the user's debit account information embedded in the QR code, and sends the generated QR code to a payment processing system. The payment processing system may be cloud-based, or may be run locally at the provider's point of sale.

In another embodiment, a computer system processes a payment using a debit network selected according to information embedded in a QR code. The computer system receives a QR code that includes portions of embedded payment information. The embedded payment information includes at least the following: a total payment amount that is to be paid by a user, debit account information for the user, and an indication of which debit network is to be used to process the payment. The computer system determines which debit network is to be used to process the payment based on the indication provided in the embedded payment information in the received QR code, sends the payment amount and the user's debit account information to the determined debit network and, after the payment has been processed, receives an indication that the payment was processed by the determined debit network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to selecting a debit network using a quick response (QR) code and to processing a payment using a debit network selected according to information embedded in a QR code. In one embodiment, a mobile computer system receives input indicating that a user has initiated a payment for various items sold by a provider of goods or services. The mobile computer system determines that the user or the provider has specified a preference indicating which debit network is to be used to process the payment. The mobile computer system then generates a QR code with the debit network selection and portions of the user's debit account information embedded in the QR code, and sends the generated QR code to a payment processing system. The payment processing system may be cloud-based, or may be run locally at the provider's point of sale.

In another embodiment, a computer system processes a payment using a debit network selected according to information embedded in a QR code. The computer system receives a QR code that includes portions of embedded payment information. The embedded payment information includes at least the following: a total payment amount that is to be paid by a user, debit account information for the user, and an indication of which debit network is to be used to process the payment. The computer system determines which debit network is to be used to process the payment based on the indication provided in the embedded payment information in the received QR code, sends the payment amount and the user's debit account information to the determined debit network and, after the payment has been processed, receives an indication that the payment was processed by the determined debit network.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the functionality disclosed herein.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 1:
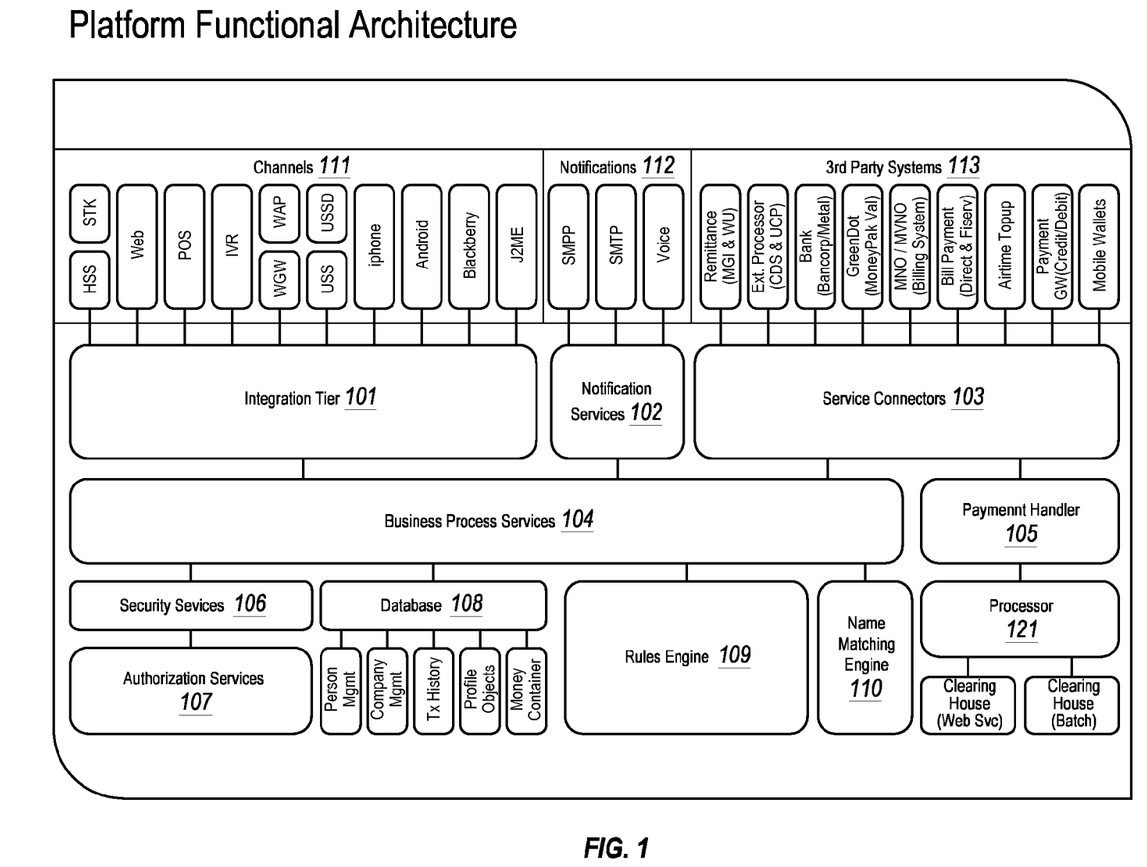
FIG. 1 illustrates a computer platform architecture for providing mobile wallet and payment processing services.

FIG. 1 illustrates an example system architecture for a mobile wallet platform. Integration tier 101 is configured to manage mobile wallet sessions and maintain integrity of financial transactions. Integration tier 101 can also include a communication (e.g., Web services) API and/or other communication mechanisms to accept messages from channels 111. Other mechanisms include, but are not limited to: International Standards Organization ("ISO") 8583 for Point of Sale ("POS") and Automated Teller Machines ("ATM") devices and Advanced Message Queuing Protocol ("AMQP") for queue based interfaces. Each of channels 111 can be integrated to one or more mechanisms for sending messages to integration tier 101. Notification services 102 is configured to send various notifications through different notification channels 112, such as, for example, Short Message Peer-to-Peer ("SSMP") for Short Messaging Service ("SMS") and Simple Mail Transfer Protocol ("SMTP") for emails. Notification services 102 can be configured through a web services API.

Service connectors 103 are a set of connectors configure to connect to 3rd party systems 113. Each connector can be a separate module intended to integrate an external service to the system architecture. Business process services 104 are configured to implement business workflows, including executing financial transactions, auditing financial transactions, invoking third-party services, handling errors, and logging platform objects. Payment handler 105 is configured to wrap APIs of different payment processors, such as, for example, banking accounts, credit/debit cards or processor 121. Payment handler 105 exposes a common API to facilitate interactions with many different kinds of payment processors.

Security services 106 are configured to perform subscriber authentication. Authorization services 107 are configured to perform client authorization, such as, for example, using a database-based Access Control List ("ACL") table.

Database 108 is configured to manage customer accounts (e.g., storing customer accounts and properties), manage company accounts (e.g., storing company accounts and properties), manage transaction histories (e.g., storing financial transaction details), store customer profiles, storing dictionaries used by the mobile wallet platform, such as, for example, countries, currencies, etc., and managing money containers. Rules engine 109 is configured to gather financial transaction statistics and uses the statistics to provide transaction properties, such as, for example, fees and bonuses. Rules engine 109 is also configured to enforce business constraints, such as, for example, transactions and platform license constraints.

Name matching engine 110 is configured to match different objects according to specified configuration rules. Matching engine 110 can be used to find similarities between names, addresses, etc. Transaction processor 121 is configured to manage financial accounts and transactions. The transaction processor 121 can be used to hold, load, withdraw and deposit funds to mobile wallet accounts. Transaction processor 121 can also be used as a common interface to a third party processor system. When used as a common interface, financial operations may be delegated to the external processor. A Clearing House subsystem of transaction processor 121 can be used to exchange the financial information with a bank.

Components of a mobile wallet platform can be connected to one another over (or be part of) a system bus and/or a network. Networks can include a Local Area Network ("LAN"), a Wide Area Network ("WAN"), and even the Internet. Accordingly, components of the mobile wallet platform can be "in the cloud". As such, mobile wallet platform components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the system bus and/or network.

The components depicted in FIG. 1 can interoperate to provide a number of financial and other services including but not limited to enrolling a customer for a mobile wallet, adding a stored value account (either hosted by a mobile wallet platform or a third party), adding a bank or credit union account to a mobile wallet, adding a debit or credit card account to a mobile wallet, depositing funds in a mobile wallet, withdrawing funds from a mobile wallet, paying bills from a mobile wallet, topping up a prepaid mobile account through a mobile wallet, transferring funds through a mobile wallet (nationally or internationally), making in-store purchases using a mobile wallet, and various other tasks as described herein below.

The telephone, smartphone, tablet or other computing system that interacts with the mobile payment system typically includes a camera, image sensor, image scanner or other hardware that allows a user to scan or capture an image. For instance, as shown in environment 200 of FIG. 2, computer system 201 may include a camera 202. The computer system 201 may include a telephone, smartphone, tablet or other type of mobile computing system. The user of the phone 201 (i.e. user/customer 205) may thus point the camera 202 or other hardware at an object such as a can of soup and either take a picture of the object, or allow software to scan the image using the camera. Software on the phone or tablet 201 then performs a local search or consults a database (e.g. over the internet) to retrieve information related to that item or product including coupons or price discounts.

Figure 2:
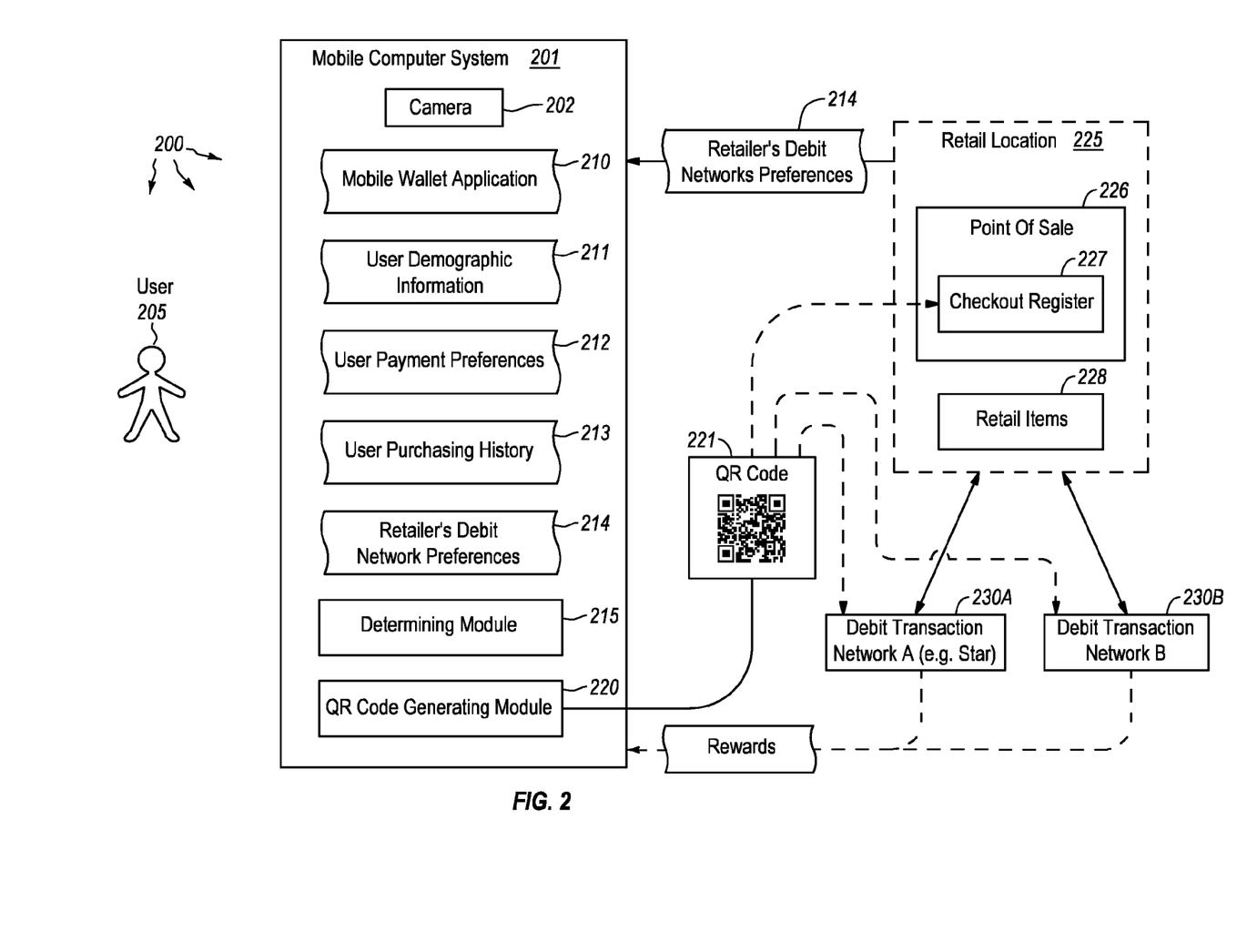
FIG. 2 illustrates an embodiment in which a debit network is selected for performing a debit transaction.

In addition to receiving product information and discounts, the user 205 may also use their phone 201 or other device to pay for the items they wish to buy. In one embodiment, a customer may be at a retail location 225 shopping for various items 228. Once the customer 205 has finished shopping, he or she proceeds to the checkout area. The checkout area includes a point of sale 226 with a checkout register 227 that typically accepts cash, debit or credit cards as payment. The checkout register 227 may also be configured to allow users to pay using a mobile wallet. Accordingly, the customer may use a mobile wallet application 210 on a smartphone (e.g. 201), tablet or other computer system to pay for the items.

When paying for the items 228, the determining module 215 of user's digital device 201 may determine that the user 205 is attempting to use their mobile wallet application 210 to pay for the items. The mobile wallet application may use various types of information to determine which debit network (e.g. 230A or 230B) is to be used to process the payment transaction. As will be understood by one skilled in the art, various different debit networks exist for processing debit transactions (e.g. Star or Nice). These debit networks conduct the transactions between the retailer's bank and the customer's bank that allow the user to pay for items using a debit card linked to their own checking (or other type of) account. These debit networks typically charge different fee amounts for each transaction, and typically receive at least a portion of that fee as income. Debit networks are thus incentivized to process an increased number of transactions and provide debit transaction services for a lower price than their competitors. Similarly, retailers are incentivized to select debit networks that process debit transactions for a lower amount. Allowing the user and/or the retailer to specify a certain debit network for processing debit transactions may lead to an increased number of users for a given network, and may lead to reduced transaction fees for retailers.

As will further be understood by one skilled in the art, debit transactions may be transactions that are processed by traditional Electronic Funds Transfer (EFT) debit networks (e.g Star, NYCE, PULSE, etc.), but they may alternatively be transactions that are processed via direct automated clearing house (ACH) debits. In such cases, the debit transactions would be sent to an Originating Depository Financial Institution (ODFI). A user may need to provide additional information about their bank (in addition to their debit account information) that would allow the ACH transaction to be routed through the ODFI, as opposed to using the traditional debit networks. As such, it will be understood that when describing debit transactions herein, the debit transactions may be processed by either a traditional debit network, or via an ACH debit that uses an ODFI to process the transaction.

In some cases, the decision as to which debit network to use for a given transaction will be based on either the customer's demographic information, the customer's payment preferences or the customer's purchasing history. For example, the user 205 may provide demographic information 211 to the mobile wallet application 210 indicating their age or age range, income or income range, general housing location (e.g. area code) or other similar information. This information may be used, at least in some cases, to provide targeted advertisements, promotions or coupons to the user via the mobile wallet. The user's demographic information 211 may provide indications or other clues that the user may prefer one debit network over another (e.g. for cost reasons, convenience reasons, or because the user is receiving a discount or reward 231 from a particular debit network). Accordingly, this information may be used by determining module 215 when determining which debit network to use for a given transaction.

Similarly, user payment preferences 212 and/or user purchasing history 213 for user 205 may be used to determine which debit network to use for a debit transaction. For example, if the user has indicated in their payment preferences which debit network to use, that information may be provided to the determining module 215. Moreover, if the user's purchasing history indicates that a specified debit network has been used in all or most of the user's debit transactions, that information could also be used by the determining module 215 when making its decision as to which debit network to use. The decision as to which debit network to use may be based on any of the following: the user's demographic information 211, the user's payment preferences 212, the user's purchasing history 213, or a combination thereof.

Still further, other factors may be taken into account when determining which debit network to use. For instance, the decision may also be based on the retailer's preferences. For example, different retailers may prefer to use certain debit networks due to various factors including pricing (e.g. price per debit transaction). Thus, retail location 225 may prefer to use debit network 230A (e.g. Star) over debit network 230B because debit network 230A charges less per debit transaction. Or, the retail location may specify that they prefer to use different debit networks at different times of the day, or may specify that they prefer to use different debit networks at their East Coast and West Coast branches. Accordingly, a retailer may specify preferences that vary based on different factors. In some embodiments, these preferences 214 may be broadcast to users' mobile wallet applications while they are shopping at the store.

Thus, in this manner, based on customer information (e.g. 211-213) and/or the retailer's preferences 214, the user's mobile wallet application 210 may determine which debit network is to be used to route the user's transaction. Once it has been determined which debit network is going to be used, a QR code 221 may be generated by module 220 with the debit network selection embedded therein. This QR code 221 may then be presented to the retailer 225 when making the purchase. The QR code has each of the necessary transaction details embedded therein, and also indicates on which debit network the transaction is to take place. In some cases, the QR code may link directly to the selected debit network (as indicated by the dotted arrow lines to debit networks 230A and 230B). In such cases, the user may route their payment for merchandise directly to the debit network using their mobile wallet.

The QR code 221 is a secure, tokenized QR code that fully represents the details of the user's purchase, along with an indication of which debit network has been specified for that transaction. This QR code is scannable by the checkout register 227 and, as a result of the scan, provides a debit network selection (e.g. debit network 230A, 230B or some other debit network) through which the transaction is to be processed.

The debit network selection may be determined dynamically for each customer. Thus, each customer may use a different debit network to process their transactions. Moreover, the debit network selection may be determined dynamically for each retailer. Thus, as with customers, each retailer may specify a certain debit network that is to be used when debit transactions are processed. In some cases, the retailer's preference for debit network may take precedence over the user's preferences or buying history. The debit network selection may also be chosen based on the location (e.g. 225) at which the payment is initiated. For instance, if the customer 205 is purchasing an item in a store on the West Coast, debit network 230A may be used, while if the user is purchasing an item from a store located on the East Coast, debit network 230B may be used. Still further, different debit networks may be used based on the time of day at which the payment is initiated, based on the per-transaction costs, based on initiation or other fees or based on any other criteria established by the retailer or by the user. These concepts will be explained further below with regard to methods 300 and 400 of FIGS. 3 and 4, respectively.

Figure 3:
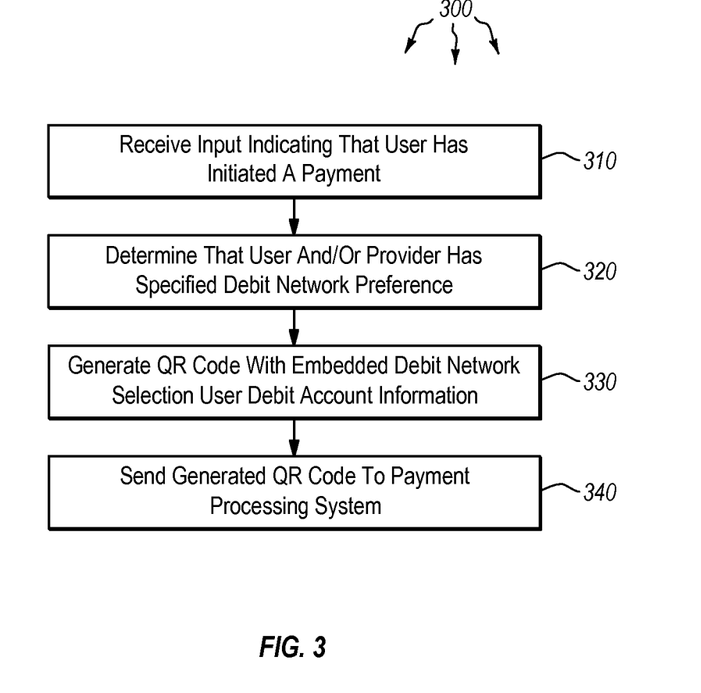
FIG. 3 illustrates a flowchart of an example method for selecting a debit network using a QR code.
Figure 4:
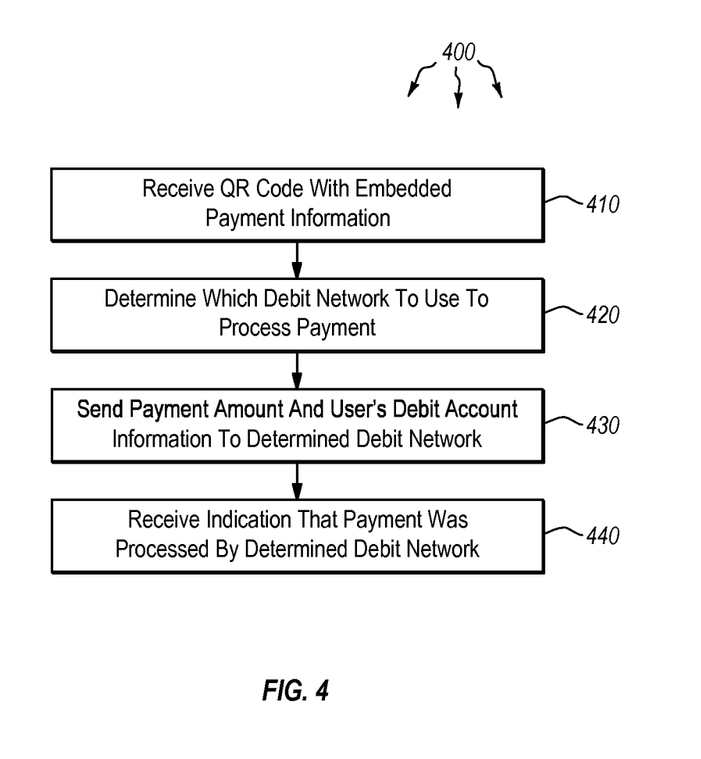
FIG. 4 illustrates a flowchart of an example method for processing a payment using a debit network selected according to information embedded in a QR code.

In view of the systems and architectures described above, methodologies that may be implemented in accordance with the disclosed subject matter will be better appreciated with reference to the flow charts of FIGS. 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 3 illustrates a flowchart of a method 300 for selecting a debit network using a QR code. The method 300 will now be described with frequent reference to the components and data of environment 200 of FIG. 2.

In Method 300, a mobile computer system receives input indicating that a user has initiated a payment for one or more items sold by a provider of goods or services (310). The mobile computer system 201 may be a cellular telephone, a tablet, a smartphone, a netbook, a laptop or any other type of mobile computing system. The mobile computer system may receive the input from a user 205 or from a retailer or provider of goods or services (e.g. 225). Thus, the user 205 may provide a touch or other input on the mobile device 201 indicating that a payment is to be initiated. Alternatively, the mobile device 201 may receive an indication from the retailer's point of sale system 206 indicating that a payment transaction has been initiated. In such cases, the input indicating that the user has initiated a payment for items sold by the provider of goods or services (i.e. the retailer) is generated by a mobile wallet application 210 running on the mobile computer system 201.

The mobile computer system 201 then determines, in Method 300, that the user and/or the provider has specified preferences indicating which debit network is to be used to process the payment (320). As shown in FIG. 2, the user may specify their debit network preferences in user payment preferences 212. The retailer or goods provider may specify their debit network preferences 214 and send them to the user's mobile device 201. The retailer's preferences may be sent with the indication that a payment has been initiated, or may be sent at another time. The user's or the retailer's preferences may be different for each user and for each retailer. Thus, a user may use different debit networks at different retail locations (e.g. 225), and the retailer may use different debit networks for different users, depending on the situation. Most commonly, however, the retailer (and likely the user) will prefer a single debit network for all of their debit transactions.

Figure 5:
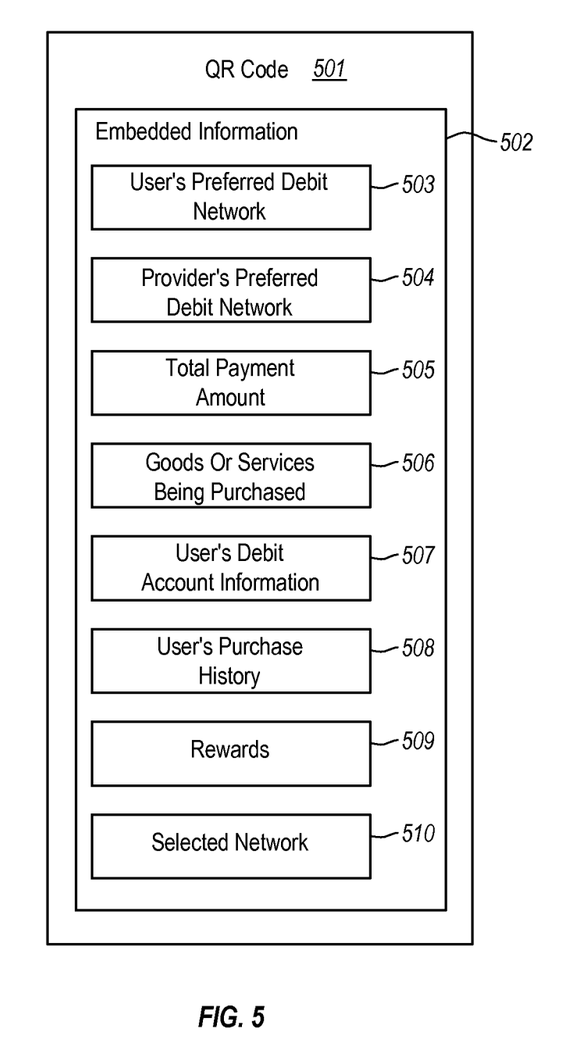
FIG. 5 illustrates a QR code with multiple portions of embedded information.

Method 300 next generates a QR code with the debit network selection and one or more portions of the user's debit account information embedded in the QR code (330). The QR code 221 thus includes information indicating which debit network will be used to process the transaction, and further includes the user's debit account information (e.g. account number, routing number, etc.). In some embodiments, as shown in FIG. 5, the QR code 501 may include many different portions of embedded information 502. While elements 503-509 are all shown as being part of embedded information 502, it will be understood that the QR code and the information embedded therein may include any one or more of the items shown (i.e. elements 503-509), or may include other items (not shown). As such, the embedded information 502 may be expanded to include any information necessary or helpful in conducting a debit transaction.

Accordingly, the embedded information may include an indication of the user's preferred debit network 503, an indication of the retailer or provider's preferred debit network 504, an indication of the total payment amount 505 that is to be processed in the debit transaction, a listing of the goods or services being purchased 506, the user's debit account information including the user's name, account number, routing number or other pertinent information, the user's purchase history (at that retail location or at other locations), and/or an indication of rewards 509 that are to be provided to the user or retailer for that particular selection of debit network. The embedded information may also, at least in some cases, include the retailer's encrypted debit account information. Indeed, each portion of embedded information may be encrypted so as to be inaccessible to unauthorized parties.

In some embodiments, the QR code may be automatically generated by the mobile wallet application 210 running on the mobile computer system 201 when the mobile wallet application is used to pay for the items. The QR code generating module 220 may determine that a payment transaction has been initiated with the retailer, and may generate the QR code 221, including one or more portions of embedded information. The QR code is secure, and tokenized, such that the code is valid for a single use. The generated QR code is then sent to a payment processing system (340).

The payment processing system may be part of the point of sale 226, or may be a cloud-based payment processing system (e.g. described in FIG. 1) that is configured to receive and process payments. In some cases, the payment processing system may sit between the user/retailer and the debit network. As such, the payment processing system may receive the QR code, and route the debit transaction to the proper debit network (e.g. 230A or 230B). Alternatively, the user may send the QR code to the retailer's point of sale, which then passes the debit transaction to the proper debit network. Still further, the user may send the QR code directly to the specified debit network, which will then decrypt the embedded information and process the debit transaction.

As mentioned above, the selection of a particular debit network may be determined dynamically for each user, and at each at each provider of goods or services. The debit network selection may include accessing the user's demographic information, the user's payment preferences and/or the user's purchasing history. During the selection process, the determining module 215 of the mobile computer system 201 may determine, based on the user's demographic information, the user's payment preferences and/or the user's purchasing history, which debit network is to be used to route the user's payment and account details. Then, based on this determination, the mobile computer system 201 may indicate the user's debit network preference 212. In other cases, the mobile computer system 201 may receive an indication 214 of the provider's preference for debit network, and may select the provider's preferred network to process the debit transaction. In at least some embodiments, the retailer's preference for debit network may be selected, regardless of the user's preferences, effectively allowing the retailer's preferences to override the user's. In this manner, a debit network may be selected for processing a debit transaction.

FIG. 4 illustrates a flowchart of a method 400 for processing a payment using a debit network selected according to information embedded in a QR code. The method 400 will now be described with frequent reference to the components and data of environment 200 of FIG. 2.

Method 400 includes receiving a QR code with one or more portions of embedded payment information, where the embedded payment information includes a total payment amount that is to be paid by a user, debit account information for the user, and/or an indication of which debit network is to be used to process the payment (410). As mentioned above, the embedded payment information 502 (as shown in FIG. 5) may include the total payment amount 505, debit account information for the user 507, and an indication of which debit network is to be used to process the payment 510, among other items which may be included in the QR code's embedded information. The QR code 221 may be sent from the user's mobile computer system 201, and may be received at a cloud-based payment system (such as that shown in FIG. 1) or at the retailer's point of sale 226. In some cases, the retailer may then forward the QR code on to a cloud-based payment system or to the selected debit network (e.g. 230A) Alternatively, the QR code may be sent directly to the selected debit network (e.g. 230B).

Method 400 next includes determining which debit network is to be used to process the payment based on the indication provided in the embedded payment information in the received QR code (420). The determining module 215 of the mobile computer system 201 may determine which debit network to use based on one or more criteria. The debit network may, for example, be selected based on the location at which the payment is initiated (e.g. 225). Additionally or alternatively, the debit network may be selected based on time of day at which the payment is initiated. Still further, criteria such as cost per debit transaction may be used (by itself, or in combination with the above criteria). The payment amount and the user's debit account information may then be sent to the determined debit network (430). After the debit transaction has been processed, the debit network will send a receipt to the retailer and/or the user 205. In some embodiments, the user and/or the retailer may receive rewards 231 (such as discounts, coupons, loyalty points, vouchers, or other offers) for selecting and using a specific debit transaction network. In such cases, these rewards may be automatically transferred to the user's mobile wallet or to the retailer upon completion of the debit transaction.

In this manner, methods, systems and computer program products are provided which select a debit network using a QR code. Embodiments allow users to purchase items using a mobile wallet that is linked to a debit account. Based on the user's purchase history or demographic information and based on the retailer's preference, the customer may generate a QR code which specifies the debit network to use when processing the customer's debit transaction. The QR code includes account information as well as the selection of debit network that is to be used to process the transaction. In this manner, a retailer may specify which debit network is to be used when processing debit transactions.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system comprising the following:
one or more processors;
system memory;
one or more computer-readable storage media having stored thereon computer-executable instructions that, when executed by the one or more processors, cause the computing system to perform a method for processing a payment using a debit network selected according to information embedded in a scannable code, the method comprising the following:
receiving a scannable code with one or more portions of embedded payment information, the embedded payment information including at least the following: a total payment amount that is to be paid by a user, debit account information for the user, and an indication of which debit network is to be used to process the payment, the debit network comprising a debit payment processing entity that processes the initiated debit payment, wherein the indication of which debit network to be used includes (1) a user preferred network, (2) a provider preferred network and (3) a selected network, such that the scannable code includes all of (1) the user preferred network, (2) the provider preferred network and (3) the selected network, the scannable code also including an identification of rewards to be provided when the selected network is used and an identification of one or more goods or services associated with the total payment amount;
determining which debit network is to be used to process the payment based on the indication provided in the embedded payment information in the received scannable code;
sending the payment amount and the user's debit account information to the determined debit network; and
receiving an indication that the payment was processed by the determined debit network.

2. The computer system of claim 1, wherein the scannable code is received from the user's mobile computer system.

3. The computer system of claim 1, wherein the scannable code is received from a retailer's point of sale.

4. The computer system of claim 1, wherein the debit network is selected based on the location at which the payment is initiated.

5. The computer system of claim 1, wherein the debit network is selected based on time of day at which the payment is initiated.

6. The computer system of claim 1, wherein the debit network is selected automatically based on one or more criteria.

7. The computer system of claim 6, wherein at least one of the criteria comprises cost per debit transaction.

8. One or more hardware storage device having stored computer-executable instructions which are operable by one or more processors of a computer system to cause the computing system to process a payment using a debit network selected according to information embedded in a scannable code by implementing the following:
the computer system receiving a scannable code with one or more portions of embedded payment information, the embedded payment information including at least the following: a total payment amount that is to be paid by a user, debit account information for the user, and an indication of which debit network is to be used to process the payment, the debit network comprising a debit payment processing entity that processes the initiated debit payment, wherein the indication of which debit network to be used includes (1) a user preferred network, (2) a provider preferred network and (3) a selected network, such that the scannable code includes all of (1) the user preferred network, (2) the provider preferred network and (3) the selected network, the scannable code also including an identification of rewards to be provided when the selected network is used and an identification of one or more goods or services associated with the total payment amount;
the computer system determining which debit network is to be used to process the payment based on the indication provided in the embedded payment information in the received scannable code;
the computer system sending the payment amount and the user's debit account information to the determined debit network; and
the computer system receiving an indication that the payment was processed by the determined debit network.

9. The hardware storage device of claim 8, wherein the scannable code is received from the user's mobile computer system and is a QR code.

10. The hardware storage device of claim 8, wherein the scannable code is received from a retailer's point of sale and is a QR code.

11. The hardware storage device of claim 8, wherein the debit network is selected based on the location at which the payment is initiated.

12. The hardware storage device of claim 8, wherein the debit network is selected based on time of day at which the payment is initiated.

13. The hardware storage device of claim 8, wherein the debit network is selected automatically based on one or more criteria.

14. The hardware storage device of claim 13, wherein at least one of the criteria comprises cost per debit transaction.

15. A computer-implemented method, which is implemented by a computing system that includes one or more processor and one or more hardware storage device having stored computer-executable instructions which are operable by the one or more processors to cause the computing system to process a payment using a debit network selected according to information embedded in a scannable code, the method comprising:

the computer system receiving a scannable code with one or more portions of embedded payment information, the embedded payment information including at least the following: a total payment amount that is to be paid by a user, debit account information for the user, and an indication of which debit network is to be used to process the payment, the debit network comprising a debit payment processing entity that processes the initiated debit payment, wherein the indication of which debit network to be used includes (1) a user preferred network, (2) a provider preferred network and (3) a selected network, such that the scannable code includes all of (1) the user preferred network, (2) the provider preferred network and (3) the selected network, the scannable code also including an identification of rewards to be provided when the selected network is used and an identification of one or more goods or services associated with the total payment amount;

the computer system determining which debit network is to be used to process the payment based on the indication provided in the embedded payment information in the received scannable code;

the computer system sending the payment amount and the user's debit account information to the determined debit network; and the computer system receiving an indication that the payment was processed by the determined debit network.

16. The method of claim 15, wherein the scannable code is received from the user's mobile computer system and is a QR code.

17. The method of claim 15, wherein the scannable code is received from a retailer's point of sale and is a QR code.

18. The method of claim 15, wherein the debit network is selected based on the location at which the payment is initiated.

19. The method of claim 15, wherein the debit network is selected based on time of day at which the payment is initiated.

20. The method of claim 15, wherein the debit network is selected automatically based on one or more criteria.

21. The method of claim 20, wherein at least one of the criteria comprises cost per debit transaction.

\* \* \* \* \*